United States Patent

Platov et al.

[15] 3,635,165
[45] Jan. 18, 1972

[54] MACHINE FOR WELDING RAILS IN THE TRACK

[72] Inventors: Vladimir Ivanovich Platov, Novo-Basmannaya ulitsa, 4/6, kv. 272; Sergei Mikhailovich Kozlov, Oxkaya ulitsa, 48/2, kv. 82, both of Moscow, U.S.S.R.

[22] Filed: Oct. 27, 1969

[21] Appl. No.: 869,761

[52] U.S. Cl. ........................................................ 104/15
[51] Int. Cl. ...................................................... E01b 31/02
[58] Field of Search ........................... 104/17, 2, 15; 105/367; 182/36, 37

[56] References Cited

UNITED STATES PATENTS

| | | | |
|---|---|---|---|
| 602,284 | 4/1898 | Eyre | 104/15 |
| 3,366,075 | 1/1968 | Clayborne et al. | 104/15 |

Primary Examiner—Arthur L. La Point
Assistant Examiner—Richard A. Bertsch
Attorney—Waters, Roditi, Schwartz & Nissen

[57] ABSTRACT

A machine for welding rails of a track comprises a moving platform on which are mounted at least two frames with uprights pivotably connected to crossbeams. These frames are mounted on ball joints on the platform so as to be capable of swinging in the direction of platform movement, as well as in transverse directions. The crossbeams of the frames are rigidly interconnected by longitudinal beams which slidably carry electric hoists and welding units.

7 Claims, 3 Drawing Figures

MACHINE FOR WELDING RAILS IN THE TRACK

The present invention relates to machines employed for welding rails of a railway track.

Widely known in the prior art are rail-welding machines with of the type provided a moving platform. In one such known machine, there is installed on the platform a crane with a boom, wherefrom the welding apparatus is suspended.

This machine, though it provides for adjusting of the welding apparatus in the direction of the track, as well as laterally thereof, has low efficiency, since in the form described above, alignment of the welding apparatus with the junction of the rails to be welded is rather difficult.

In another known machine adapted to weld rails, there are installed on the platform in succession with a capability of swinging in the track direction at least two parallel frames provided with posts and crossbeams, the latter of which are movably connected to each other by at least two longitudinal beams which carry the welding apparatus.

This rail-welding machine, though ensuring adequate efficiency, permits adjusting the welding equipment only in the track direction.

A main object of the present invention is to provide a machine to weld rails of tracks, which is efficient and provides for welding rails located both inside and outside the gauge.

This object is achieved in to that, in a rail-welding machine, frame posts are, according to the invention, hinge jointed to their crossbeams, while the movable connection of the frames to the platform allows swinging thereof in directions parallel to their planes.

The movable connection of the frames with the platform is preferably effected through a ball joint. Such a design of the rail-welding machine ensures rapid adjustment of the welding apparatus to the junction place thereof of rails located along the track, both laterally inside and outside location.

The present invention is further exemplified by a description of a particular embodiment thereof in conjunction with appended drawings, wherein.

Figure 2:
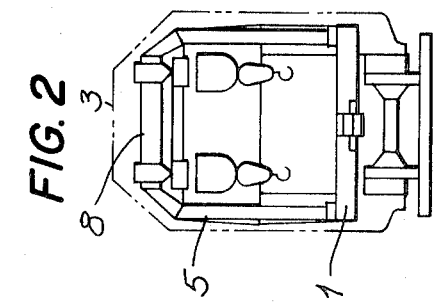
FIG. 2 is a front view thereof.
Figure 1:
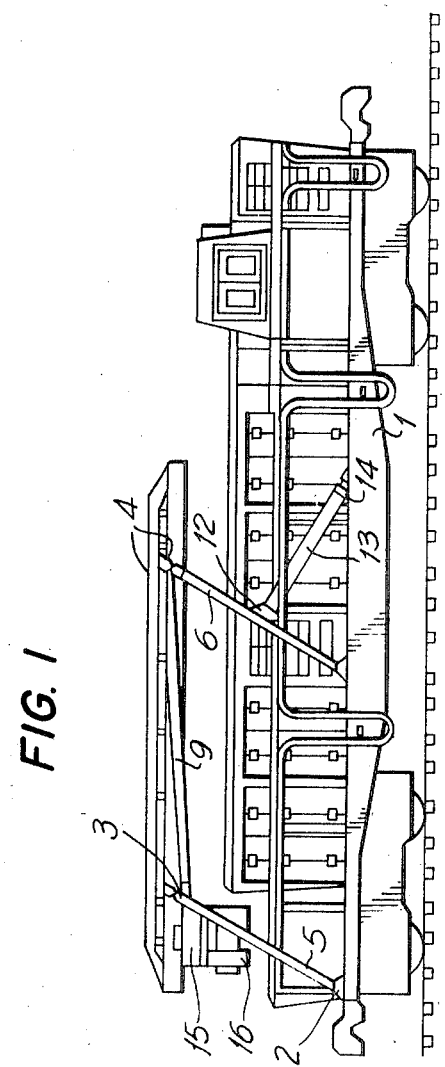
FIG. 1 is a side elevational view which diagrammatically shows the machine for welding rails of a track.

The rail-welding machine of the invention comprises a moving platform 1 (FIGS. 1 and 2), installed on which, by means of ball joints 2 are frames 3 and 4 located in succession in the direction of movement of platform 1. The ball joints 2 permit frames 3 and 4 swing in the direction of movement of platform 1 i.e., longitudinally, as well as in directions parallel to the planes of these frames i.e., transversely.

Figure 3:
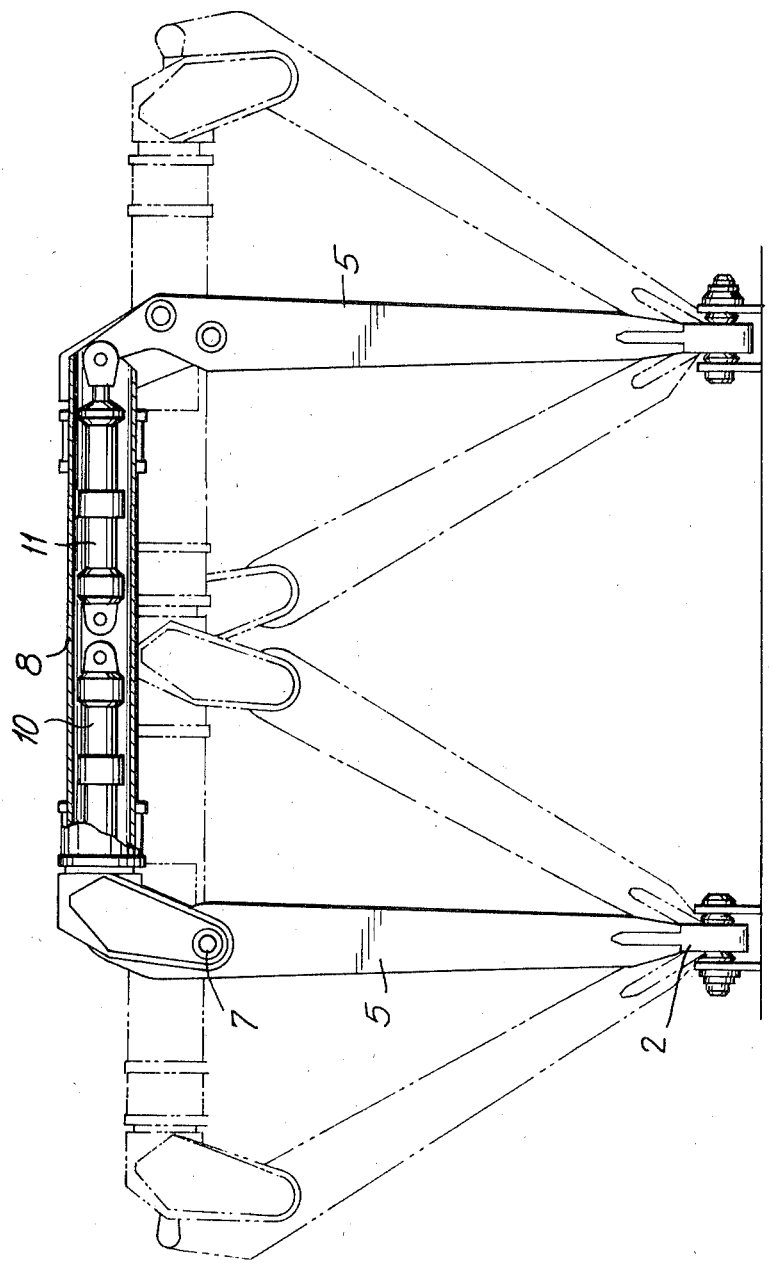
FIG. 3 is a front view of the machine frame.

Frames 3 and 4 respectively comprise uprights 5 and 6 connected through ball joints 7 (FIG. 3) to crossbeams 8.

The crossbeams 8 of frames 3 and 4 are connected to each other by longitudinal beams 9 (FIG. 1) which are rigidly braced with each other. Movably mounted on crossbeams 8 of frames 3 and 4 are hydraulic cylinders 10 and 11 (FIG. 3,) whose piston rods are hinge jointed to uprights 5 and 6. By operating hydraulic cylinders 10 and 11 the angle between uprights 5 and 6 and the crossbeams 8 of frames 3 and 4 can be varied. Fixed to uprights 6 of frame 4 through ball joints 12 (FIG. 1) are the piston rods of two hydraulic cylinders 13, whose housings are mounted through ball joints 14 on the platform. These hydraulic cylinders provide for the longitudinal movement of frames 3 and 4 together with longitudinal beams 9. Mounted on longitudinal beams 9 are electric hoists 15 with the welding apparatuses 16. Electric hoists 15 can move along beams 9 so to position the welding apparatuses 16 in welding position or to place them on platform 1 into a transportation position.

The rail-welding machine can be self-propelled over short distances, and can be transported long distances in a train.

The welding machine operates as follows.

The machine is transported to the place where welding is required. Longitudinal beams 9 located within the platform are brought to the working position by frames 3 and 4 actuated by the hydraulic cylinders 10 and 11. Then the welding apparatuses 16 are placed by the electric hoists 15 on the rail junctions which are then welded together. Thereupon two electric winches (not shown in the drawing) fixed under platform 1 transport new rails to the next junction to be welded. The machine approaches this junction and welds it. After the machine leaves the welded joint, the joint is machined and, when necessary, heat treated.

If the rails to be welded are located at curves, as well as outside or inside the gauge, frames 3 and 4 are turned by hydraulic cylinders 10 and 11 about ball joints 2 to the required side so as to place welding apparatuses 16 over the rail junctions to be welded.

What we claim is:

1. A machine for welding rails of a track comprising a platform movable along rails in a longitudinal direction, a pair of frames located in succession on the platform, each frame including uprights and a crossbeam connected to said uprights, means connecting said uprights to said platform for longitudinal and transverse pivotal movement of said uprights relative to said platform, at least two longitudinal beams connected to the crossbeams of both frames for movement therewith, and welding means mounted on said longitudinal beams.

2. A machine as claimed in claim 1 wherein said welding means comprises a hoist displaceable along said longitudinal beams and a welding apparatus supported by said hoist.

3. A machine as claimed in claim 1 comprising ball joints connecting said uprights and said crossbeams.

4. A machine as claimed in claim 1 wherein said means connecting the uprights to the platform comprises ball joints.

5. A machine as claimed in claim 1 comprising means connecting said uprights and crossbeam of one frame to vary the angle therebetween and pivot the frame transversely.

6. A machine as claimed in claim 5 wherein said means connecting said uprights and crossbeam comprises hydraulic cylinders.

7. A machine as claimed in claim 1 comprising means connecting the uprights of one of said frames with the platform to vary the angle therebetween and pivot the frames longitudinally.

* * * * *